United States Patent
Burkes

(10) Patent No.: US 8,405,398 B2
(45) Date of Patent: Mar. 26, 2013

(54) INFORMATION HANDLING SYSTEM BATTERY EMULATION TESTING SYSTEM AND METHOD

(75) Inventor: Philip Burkes, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 13/173,742

(22) Filed: Jun. 30, 2011

(65) Prior Publication Data

US 2013/0006599 A1   Jan. 3, 2013

(51) Int. Cl.
*G01R 31/36* (2006.01)
*H02J 7/00* (2006.01)

(52) U.S. Cl. .................. 324/426; 320/106; 320/130

(58) Field of Classification Search .................. 324/426
See application file for complete search history.

(56) References Cited

U.S. PATENT DOCUMENTS

| | | | | |
|---|---|---|---|---|
| 5,821,755 | A * | 10/1998 | Henze | 324/426 |
| 6,016,047 | A | 1/2000 | Notten et al. | |
| 6,204,647 | B1 * | 3/2001 | Niemann et al. | 323/282 |
| 2006/0132098 | A1 * | 6/2006 | Lin et al. | 320/150 |
| 2006/0217152 | A1 | 9/2006 | Fok et al. | |
| 2010/0189008 | A1 * | 7/2010 | Jin et al. | 370/252 |

* cited by examiner

*Primary Examiner* — Drew A Dunn
*Assistant Examiner* — Johali Torres Ruiz
(74) *Attorney, Agent, or Firm* — Hamilton & Terrile, LLP; Robert W. Holland

(57) ABSTRACT

Information handling systems are tested for proper interaction with integrated batteries by simulating a battery connection at a battery port of the information handling system. A battery connector couples to the battery port and communicates through cables with a management bus, a programmable power source and a programmable load. The management bus supports communication with a battery management unit that imitates responses for the information handling system that are expected from a battery. A battery emulator controls the programmable power source and load to provide the information handling system with an expected battery response for confirming proper operation of the information handling system power subsystem without requiring insertion of an actual battery.

15 Claims, 2 Drawing Sheets

INFORMATION HANDLING SYSTEM BATTERY EMULATION TESTING SYSTEM AND METHOD

BACKGROUND OF THE INVENTION

1. Field of the Invention

The present invention relates in general to the field of information handling system integrated power supplies, and more particularly to an information handling system battery emulation testing system and method.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems have gained wide acceptance among end users due in part to the increased flexibility that end users gain from portable systems. Portable information handling systems are built in portable housings that allow an end user to readily carry the system and use the system on the go. Increasing capabilities and decreasing sizes of components that are used to build portable information handling systems have provided portable systems comparable in processing power to desktop or other fixed systems. In order to provide portability, portable information handling systems integrate into the portable housing both I/O devices, such as a keyboard and display, and a power source, such as a rechargeable battery. An end user can thus operate the portable information handling system free from any hardwired connections for as long as the battery maintains an adequate charge. When the battery runs out of charge, the end user can continue operating the information handling system by connecting an external power source, such as an AC-to-DC adapter. The external power source also typically recharges the battery.

Although more powerful processing components provide more functionally-capable information handling systems, they also tend to consume more power. Portable information handling systems have a variety of sizes, configurations and components so that different types of batteries are typically needed for different types of systems to meet different discharge rate and charge life requirements. Lithium-based rechargeable batteries tend to be expensive, particularly for portable information systems that have relatively large power consumption. Because batteries tend to lose their ability to hold a charge over time and usage, portable information handling systems typically have a battery cavity that releases the battery to allow replacement. Thus, in addition to the varied charge-life and discharge capabilities needed for different types of information handling systems, portable batteries also have varied types of housings so that the battery housing is compatible with varied types of information handling system housings.

Portable information handling system batteries have evolved into smart subsystems that actively manage interactions with an information handling system. An integrated circuit included in the battery housing communicates with an information handling system through a management bus, such as SMBus. Often, the smart battery and information handling system have to exchange encrypted information before the battery provides or receives a charge in order to confirm that the battery and information handling system are compatible. The many variations in information handling system battery configurations leads to difficulties for manufacture and repair locations, which run tests on portable information handling systems to ensure that a power subsystem properly charges and discharges a battery. One difficulty is that maintaining a large inventory of different types of batteries for inserting into information handling systems during testing is expensive and often wasteful. Batteries deteriorate over time and with usage so that the inventory tends to have a substantial turnover. Disposing of batteries presents environmental difficulties since batteries tend to have potentially dangerous materials. Even shipping batteries can present a difficulty since airplanes are often limited in the number of batteries that they can carry.

SUMMARY OF THE INVENTION

Therefore a need has arisen for a system and method which tests information handling system power subsystems without excessive reliance on batteries in the test process.

In accordance with the present invention, a system and method are provided which substantially reduce the disadvantages and problems associated with previous methods and systems for testing information handling system power subsystems. A battery emulator connector couples to an information handling system battery port to imitate the battery designed for the information handling system during power subsystem testing. The use of the battery emulator minimizes or eliminates the use of actual batteries in support of power subsystem testing.

More specifically, an information handling system processes information with plural processing components powered by a power subsystem and re-chargeable battery. The battery has a connector that removably couples with a battery port of the information handling system. A battery management unit integrated circuit built into the battery housing communicates with processing components of the information handling system through a management bus of the battery port to coordinate charging the battery from the information handling system and discharging the battery to the information handling system. A battery emulator imitates a battery for testing the information handling system with power transfers and management information communication passed through a battery connector to the battery port and information handling system power subsystem. A battery management unit interfaces with the battery port management bus and the battery emulator to generate management information for the power subsystem that imitates the presence of the battery, such as providing an identifier indicating the presence of the correct battery for the information handling system. The battery emulator imitates battery charge characteristics with a programmable load and imitates battery discharge characteristics with a programmable power supply. The battery emulator coordinates the use of a battery identifier, battery charge characteristics and battery discharge characteristics based upon the type of information handling system under test.

The present invention provides a number of important technical advantages. One example of an important technical advantage is that the use of physical batteries in the testing of information handling system power subsystems is reduced or eliminated. A battery emulator imitates the interactions that an information handling system would normally have with a battery to allow a complete test of information handling system power subsystem functionality. Instead of maintaining an inventory of many different types of batteries, a single battery emulator provides system appropriate interactions based upon the type of information handling system under test. Ending test reliance upon an inventory of different types of batteries reduces costs and the environmental impact of testing. Further, the battery emulator provides a consistent testing system so that a failing test battery will not cause false information handling system test failure indications.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A battery emulator imitates the presence of a battery at an information handling system battery port to allow testing of a power subsystem of the information handling system without loading an actual battery into the battery port. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
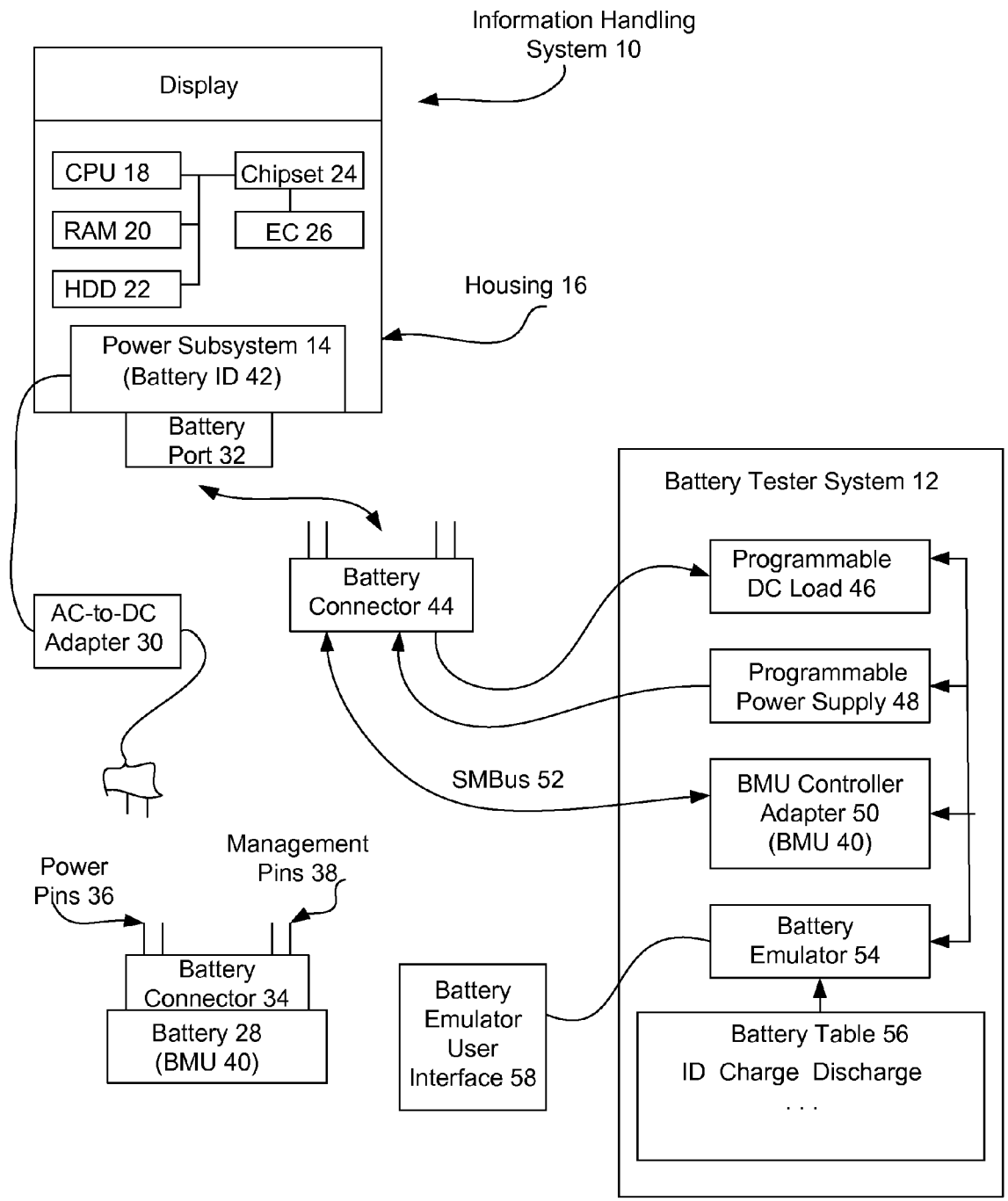
FIG. 1 depicts a block diagram of an information handling system and battery tester to confirm proper operations of the information handling system power subsystem.

Referring now to FIG. 1, a block diagram depicts an information handling system 10 and battery tester system 12 to confirm proper operations of the information handling system power subsystem 14. Information handling system 10 is built in a portable housing 16 that contains plural processing components that cooperate to process information, such as a CPU 18, RAM 20, a hard disk drive 22 and chipset 24. An embedded controller 26 provides management functions for information handling system 10, such as managing functions when information handling system 10 is in a powered-off or low-power state. For example, embedded controller 26 manages the operation of power subsystem 14 to permit charging of a battery 28 from an external AC-to-DC power adapter 30 during a powered down state.

During normal operations, power subsystem 14 provides power to operate the processing components using either external power of AC-to-DC power adapter 30 or internal power of battery 28. If AC-to-DC power adapter 30 is providing external power, power subsystem 14 uses any excess power not needed for running the processing components to charge battery 28. If the processing components are powered down, power subsystem 14 uses external power to charge battery 28 to a full charge. If AC-to-DC power adapter 30 is disconnected, power subsystem 14 converts from the use of external power to instead provide power by discharging battery 28. Once the charge of battery 28 decreases to a predetermined level, power subsystem 14 coordinates a power down of the processing components to avoid a forced shutdown by a lack of battery charge. Power subsystem 14 obtains power from battery 28 through a battery port 32 of information handling system 10 that accepts a battery connector 34. Power pins 36 allow power transmission from battery 28 to information handling system 10 during battery discharge and from information handling system 10 to battery 28 during charge. Management pins 38 support communication of management information through a management bus between power subsystem 14 and a battery management unit 40 integrated in battery 28. Battery management unit 40 is an integrated circuit that controls battery operations. For example, battery management unit 40 and power subsystem 14 limit interactions between battery 28 and information handling system 10 until an identifier 42 is exchanged that confirms that battery 28 is an appropriate battery for use with information handling system 10.

A conventional test of power subsystem 14 generally involves inserting a battery 28 into battery port 32 to ensure that power subsystem 14 correctly manages communication, charging and discharging with battery 28. In order to avoid the use of a battery during a test of power subsystem 14, battery tester system 12 imitates the presence of a battery with signals introduced by a tester battery connector 44 to battery port 32. Battery tester accomplishes imitation of a battery by presenting an identifier of a system-compliant battery as if from a battery management unit and then responding to charges and discharges coordinated with power system 14 as a system-compliant battery would respond. Battery tester 12 imitates battery charges to a battery by receiving battery charge current generated by power subsystem 14 at port 32 and through connector 44 with a programmable active direct current load 46. Programmable load 46 accepts current from power subsystem 14 by changing the load over time to imitate the charge characteristics of a battery associated with information handling system 10. Battery 12 imitates battery discharges to power subsystem 14 by generating a current with a programmable direct current power supply 48. Programmable power supply 48 generates a current for transmission through connector 44 to port 32 that imitates the discharge characteristics of a battery associated with information handling system 10, such as by diminishing over time and expiring at an expected battery charge life. A battery management unit adapter 50 coordinates the exchange of identification information and battery events by establishing communications over a SMBus or other management bus 52 with power subsystem 14. Battery management unit adapter 50 contains a battery management unit integrated circuit 40 like those built into batteries to provide imitations of normal battery interactions with power subsystem 14.

In operation, a battery emulator 54, such as an information handling system having a processor and memory to execute an application, coordinates testing of power subsystem 14 by configuring battery tester system 12 to imitate a battery associated with information handling system 10. Battery emulator 54 retrieves an identifier, charging characteristics and discharging characteristics for an information handling system type from a battery table 56. Battery emulator 54 provides the identifier to battery management unit adapter 50 to establish communications over connector 52 and battery port 32 with power subsystem 14. Battery emulator 54 applies battery charge characteristics to programmable load 46 to imitate a battery receiving a charge, such as parameters for the amount of time required for a charge and decreasing charge current over time. Battery emulator 54 applies battery discharge characteristics to programmable power source 48 to imitate a battery discharge for powering information handling system 10, such as parameters for charge life of a battery and decreasing available current over a discharge time. In one embodiment, battery emulator 54 adjusts battery characteristics to imitate a battery age or useful life remaining, such as a 70% or 80% charge availability. In another embodiment, battery emulator imitates a failed battery to test the ability of power subsystem 14 to detect a failed battery.

Battery emulator 54 accepts end user inputs at a user interface 58 that establish the type of battery to imitate. Alternatively, battery emulator 54 automatically establishes a battery type that is compliant with the battery type or types required by information handling system 10. For example, battery emulator 54 inquires with information handling system 10 to obtain the type of battery and then applies the type of battery from battery table 56 to initiate battery imitation. Battery emulator 54 can inquire by reading an identifier from information handling system 10 through management bus 52 or through a separate network interface. Alternatively, battery emulator 54 directs battery management unit 40 to sequence through a list of battery identifiers until information handling system 10 responds by accepting the battery identifier as a compliant identifier.

Figure 2:
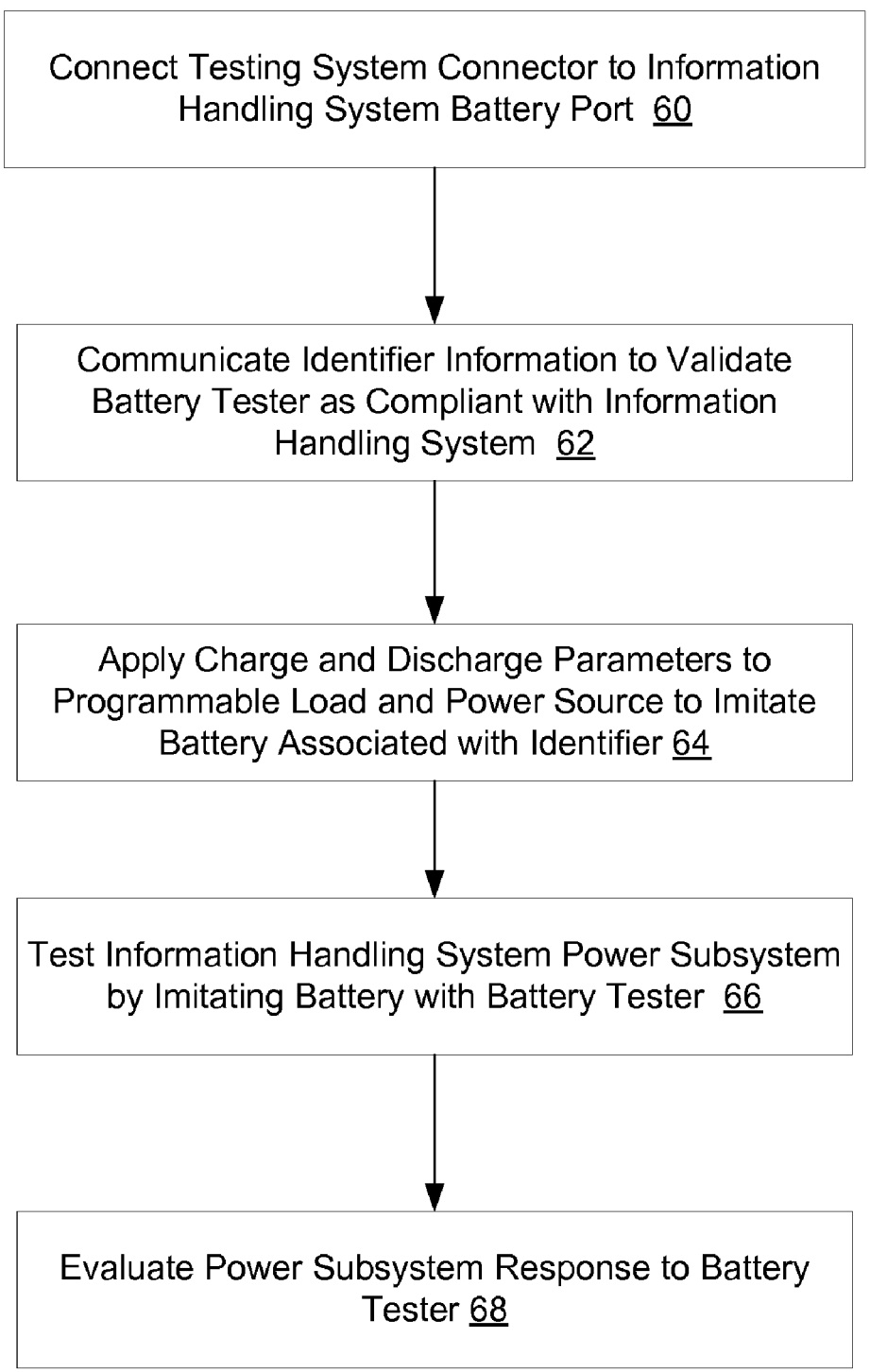
FIG. 2 depicts a flow diagram of a process for testing interactions between an information handling system and a simulated battery.

Referring now to FIG. 2, a flow diagram depicts a process for testing interactions between an information handling system and a simulated battery. At step 60, battery test system 12 couples connector 44 to battery port 32 of the information handling system 10 under test. At step 62 battery management unit adapter 50 and power subsystem 14 exchange identifiers to establish the presence of an imitated battery. At step 64, battery emulator 54 applies the battery parameters to imitate the charging characteristics and discharging characteristics of the battery. At step 66, the power subsystem is tested by performing test charges and discharges, such as by connecting and disconnecting AC-to-DC power adapter 30. Power characteristics of power subsystem 14 are evaluated as if an actual battery is connected to battery port 32. In addition, power readings from programmable load 46 and programmable power supply 48 may be evaluated to determine power subsystem response. In one embodiment, certain test conditions may be created by battery emulator 54 through direction of an end user at graphical user interface 58, such as a battery failure or a low power condition, in order to evaluate power subsystem response. At step 68, the test is completed and connector 44 is removed from battery port 32. Power subsystem 14 is evaluated based upon its processing of commands received over management bus 52, control commands sent over management bus 52, charge sent to programmable load 46 and managing application of power sent as an imitated discharge from programmable power source 48.

Although the present invention has been described in detail, it should be understood that various changes, substitutions and alterations can be made hereto without departing from the spirit and scope of the invention as defined by the appended claims.

What is claimed is:

1. A system for testing an information handling system, the system comprising:
a battery connector operable to electrically couple with a battery port of an information handling system under test to transfer power and management information;
a programmable power supply interfaced with the battery connector and operable to provide a simulated battery discharge at the battery connector for transmission to the battery port, the simulated battery discharge having predetermined battery discharge parameters;
a programmable load interfaced with the battery connector and operable to accept an information handling system charge from the battery port through the battery connector, the programmable load having predetermined battery charge parameters;
a management bus controller interfaced with the battery connector and operable to communicate management information through the battery port to the information handling system under test;
a battery emulator interfaced with the programmable power supply, programmable load and management bus controller, the battery emulator operable to apply charge and discharge characteristics of a predetermined battery to emulate the predetermined battery discharge parameters, charge parameters and management information associated with the predetermined battery; and
a battery table interfaced with the battery emulator, the battery table storing plural battery types by battery type identification information, each battery type identification information having associated charge and discharge characteristics;
wherein the battery emulator is further operable to retrieve battery type identification information from the information handling system under test and to automatically apply the battery type identification information to select the predetermined battery type to emulate from plural battery types of the battery table by applying charge and discharge characteristics retrieved from the battery table.

2. The system of claim 1 further comprising a battery management unit interfaced with the management bus controller and the battery emulator, the battery management unit operable to generate the management information.

3. The system of claim 1 wherein the battery management unit comprises an integrated circuit configured for manufacture into a battery to manage battery interactions with an information handling system.

4. The system of claim 1 further comprising battery management unit logic executing on the battery emulator and operable to generate management information of a battery management unit.

5. The system of claim 1 further comprising a power adapter operable to connect to an information handling system to provide power to the information handling system for generating a charge to transmit to the programmable load.

6. The system of claim 1 wherein the programmable load battery charge parameters comprise an increasing load over a charge time that replicates a battery charge of the predetermined battery.

7. The system of claim 1 wherein the programmable power supply battery discharge parameters comprise a decreasing current over a discharge time that replicates a battery discharge of the predetermined battery.

8. The system of claim 1 further comprising a user interface generated by the battery emulator, the user interface presenting plural batteries available for emulation, each of the plural batteries having battery charge and discharge parameters, the user interface operable to accept an end user selection of one of the plural batteries and to apply the battery charge and discharge parameters associated with the end user selection for use by the programmable power supply and programmable load.

9. A method for testing an information handling system comprising:
inserting a battery connector into a battery port of the information handling system under test;
generating a simulated battery discharge current with a programmable power supply;
transmitting the simulated battery discharge current through a cable to the battery connector;
comparing information handling system under test operations in response to the simulated battery discharge current with predetermined operations to evaluate the operation of the information handling system under test power subsystem;
sending identification information from the information handling system under test through the battery port and battery connector to a battery emulator; and
automatically applying the identification information at the battery emulator to select a simulated battery current for transmission to the battery connector.

10. The method of claim 9 wherein sending identification information further comprises:
sending an identifier from the information handling system through a management bus connected to the battery port and battery connector;
receiving the identifier at a battery management unit interfaced with the management bus; and
sending the identifier from the battery management unit to the battery emulator.

11. The method of claim 9 further comprising:
sending each of plural battery identifiers from a battery management unit through a management bus of the battery connector and battery port until the information handling system confirms a selected battery identifier;
communicating the selected battery identifier to a battery emulator; and
automatically applying the selected battery identifier at the battery emulator to select a simulated battery current for transmission to the battery connector.

12. The method of claim 9 further comprising:
selecting an information handling system identifier at a battery emulator;
applying the information handling system identifier to select a battery type from plural battery types, each of the plural battery types having an associated simulated battery current;
communicating the battery type to a battery management unit;
communicating the battery type from the battery management unit through a management bus, through the battery connector, through the battery port and to the information handling system; and
applying the battery type at the information handling system to accept the associated simulated battery current at the battery port.

13. The method of claim 9 further comprising:
generating a battery charge current at the information handling system;
sending the battery charge current from the battery port through the battery connector to a programmable load that simulates a charging battery; and
comparing information handling system operations in response to the simulated programmable load with predetermined operations to evaluate the operation of the information handling system power subsystem.

14. The method of claim 13 further comprising:
interfacing a battery management unit with the information handling system through the battery connector and battery port; and
coordinating between the battery management unit and the information handling system to manage the simulated battery discharge and the battery charge current.

15. The method of claim 14 wherein interfacing a battery management unit further comprises communicating between the information handling system and battery management unit through a SMBus of the battery connector.

* * * * *